US011035507B2

United States Patent
Yanagisawa

(10) Patent No.: US 11,035,507 B2
(45) Date of Patent: Jun. 15, 2021

(54) PIPE CONNECTOR

(71) Applicant: SANOH INDUSTRIAL CO., LTD., Tokyo (JP)

(72) Inventor: Ryo Yanagisawa, Ibaraki (JP)

(73) Assignee: SANOH INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 16/489,418

(22) PCT Filed: Jan. 31, 2018

(86) PCT No.: PCT/JP2018/003148
§ 371 (c)(1),
(2) Date: Aug. 28, 2019

(87) PCT Pub. No.: WO2018/159201
PCT Pub. Date: Sep. 7, 2018

(65) Prior Publication Data
US 2019/0390807 A1    Dec. 26, 2019

(30) Foreign Application Priority Data
Feb. 28, 2017  (JP) .............................. JP2017-037535

(51) Int. Cl.
*F16L 21/04*   (2006.01)
*F16L 37/088*  (2006.01)

(52) U.S. Cl.
CPC ........... *F16L 21/045* (2013.01); *F16L 37/088* (2013.01)

(58) Field of Classification Search
CPC ... F16L 37/0841; F16L 37/025; F16L 37/088; F16L 37/144; F16L 21/045
(Continued)

(56) References Cited

U.S. PATENT DOCUMENTS 8,297,659 B2 * 10/2012 Callahan ............... F16L 37/144
                                                              285/93
8,408,604 B2 *  4/2013 Yamada .............. F16L 37/0885
                                                             285/305
(Continued)

FOREIGN PATENT DOCUMENTS

EP    2541118 A1    1/2013
EP    2988048 A1    2/2016
(Continued)

OTHER PUBLICATIONS

Search Report and Written Opinion in International Application No. PCT/JP2018/003148 dated Apr. 3, 2018, 8 pages (translation of search report only).
(Continued)

*Primary Examiner* — David Bochna
(74) *Attorney, Agent, or Firm* — Marshall, Gerstein & Borun LLP

(57) ABSTRACT

A pipe connector includes: a housing in which an insertion hole is formed, a pipe being inserted into the insertion hole; at least one O-ring that forms a seal between an inner circumferential surface of the insertion hole and an outer circumferential surface of the pipe; a restricting member that is attached to the housing from an outer side in a radial direction of the pipe; and a restricting portion that is provided at the restricting member, wherein the restricting portion bends towards an opposite side from an insertion direction of the pipe when the restricting member is pressed from the outer side in the radial direction of the pipe towards an inner side thereof, and elastically returns so as to restrict movement of the at least one O-ring towards the opposite side from the insertion direction of the pipe when the restricting member has been attached to the housing completely.

18 Claims, 10 Drawing Sheets

(58) Field of Classification Search
USPC .................................................. 285/305, 93
See application file for complete search history.

(56) References Cited

U.S. PATENT DOCUMENTS

| | | | |
|---|---|---|---|
| 9,915,388 B2* | 3/2018 | Hatanaka | F16L 37/144 |
| 10,047,888 B2* | 8/2018 | Nishiyama | F16L 37/0885 |
| 2010/0019483 A1* | 1/2010 | Bokuhn | F16L 37/144 |
| | | | 285/93 |
| 2015/0377396 A1 | 12/2015 | Rosin et al. | |
| 2016/0040813 A1 | 2/2016 | Hatanaka | |
| 2016/0069496 A1 | 3/2016 | Tayama et al. | |
| 2016/0281894 A1 | 9/2016 | Freter et al. | |
| 2017/0146173 A1* | 5/2017 | Chaupin | F16L 37/144 |
| 2019/0271427 A1* | 9/2019 | Zhou | F16L 37/1225 |

FOREIGN PATENT DOCUMENTS

| | | |
|---|---|---|
| JP | 11-311386 A | 11/1999 |
| JP | 2005-127394 A | 5/2005 |
| JP | 5497223 B1 | 5/2014 |
| WO | WO-2014/0171329 A1 | 10/2014 |
| WO | WO-2014/0171330 A1 | 10/2014 |
| WO | WO-2014/0171331 A1 | 10/2014 |

OTHER PUBLICATIONS

Extended European Search Report in EP Application No. 18760974.8 dated Dec. 22, 2020, 7 pages.

* cited by examiner

FIG.2
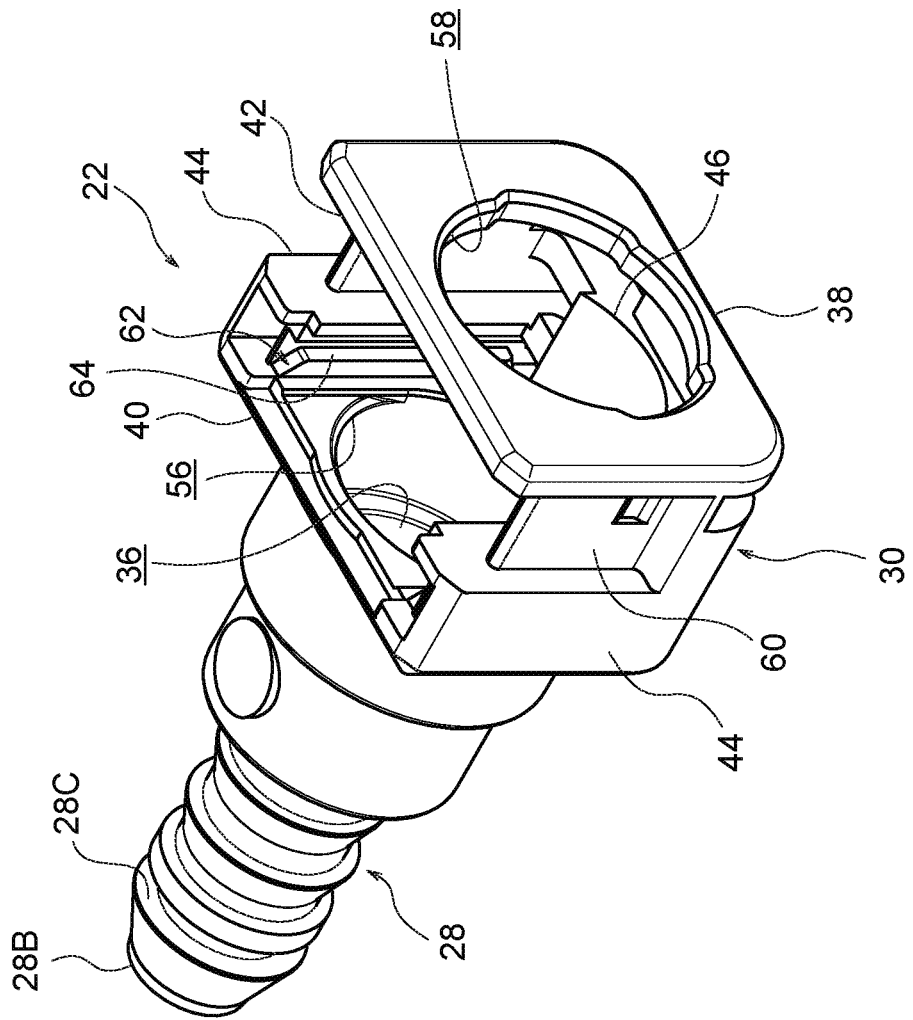
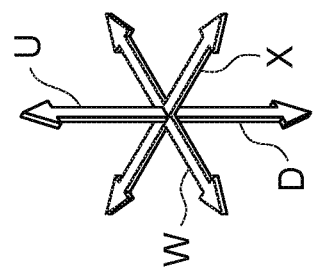

FIG.7
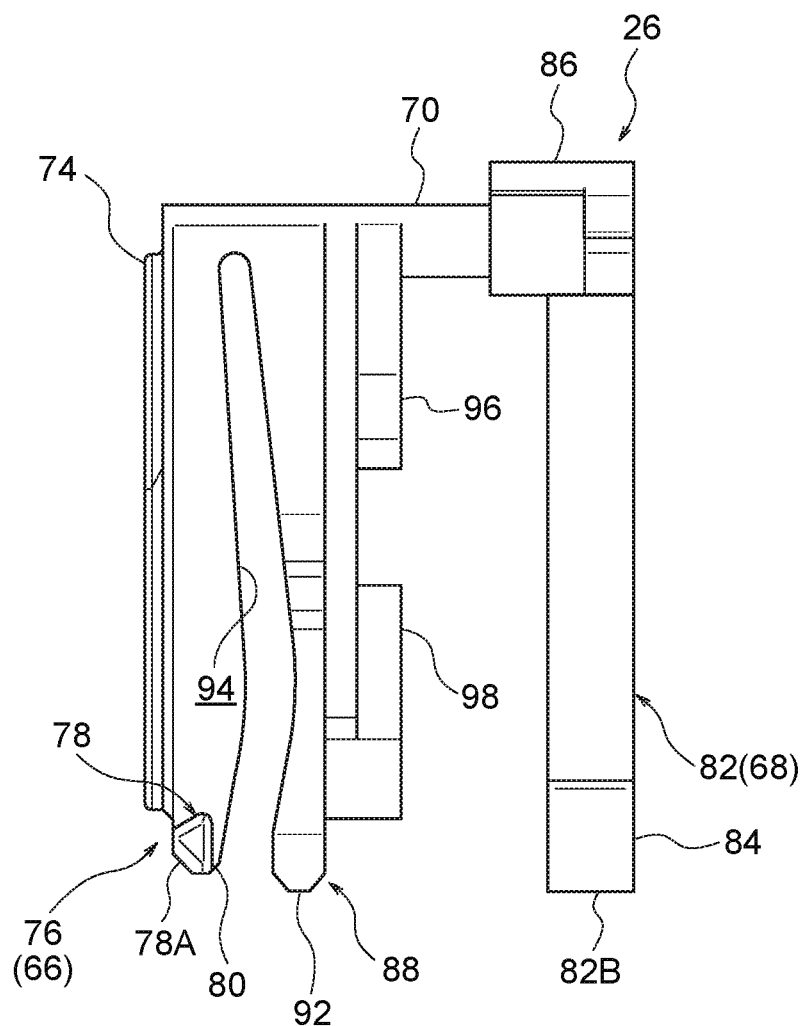
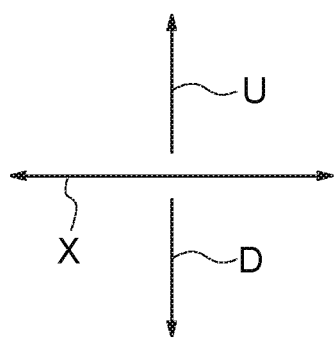

PIPE CONNECTOR

TECHNICAL FIELD

The present disclosure relates to a pipe connector.

BACKGROUND ART

In a pipe connector disclosed in Japanese Patent No. 5497223, a retainer is attached to a housing from an intersection direction that intersects an insertion direction of a pipe.

SUMMARY OF THE INVENTION

Technical Problem

In the pipe connector disclosed in Japanese Examined Patent Application Publication No. 5497223, a restricting portion of the retainer restricts movement of an O-ring that is disposed within an insertion hole in the housing. The restricting portion of the retainer engages with a spool of a pipe inserted into this insertion hole, and thereby inhibits movement of the pipe in a withdrawal direction.

However, in the above-described pipe connector, because the retainer is attached to the housing from an intersection direction that intersects the pipe insertion direction, if the O-ring protrudes from an insertion aperture of the insertion hole, in some cases, the restricting portion abuts against the protruding portion of the O-ring. Depending on the extent to which the O-ring is protruding from the insertion hole, and on the angle at which the restricting portion of the retainer abuts against the protruding portion of the O-ring, there is a possibility that the O-ring will malfunction. Because of this, when the retainer is being attached to the housing, it is necessary to attach the retainer to the housing while simultaneously checking the protrusion of the O-ring from the insertion hole, so that the attachment operation is made more complex.

It is an object of the present disclosure to provide a pipe connector, in a structure in which a restricting member that restricts movement of an O-ring disposed inside a housing is attached to the housing from an outer side in a radial direction of the pipe, this restricting member is attached to the housing via a simple operation at the same time as any malfunctioning of the O-ring is inhibited.

Solution to the Problem

A pipe connector according to an aspect of the present disclosure includes: a housing in which an insertion hole is formed, a pipe having an annular spool being inserted into the insertion hole; at least one O-ring that is disposed inside the insertion hole, and that forms a seal between an inner circumferential surface of the insertion hole and an outer circumferential surface of the pipe; a restricting member that is attached to the housing from an outer side in a radial direction of the pipe; and a restricting portion that is provided at the restricting member, wherein the restricting portion bends towards an opposite side from an insertion direction of the pipe when the restricting member is pressed from the outer side in the radial direction of the pipe towards an inner side in the radial direction of the pipe, and elastically returns so as to restrict movement of the at least one O-ring towards the opposite side from the insertion direction of the pipe when the restricting member has been attached to the housing completely.

Advantageous Effects of the Invention

The present disclosure makes it possible to provide a pipe connector in which, in a structure in which a restricting member that restricts movement of an O-ring disposed inside a housing is attached to the housing from an outer side in a radial direction of the pipe, the restricting member is attached to the housing via a simple operation at the same time as any malfunctioning of the O-ring is inhibited.

BRIEF DESCRIPTION OF THE DRAWINGS

FIG. 2 is a perspective view of a housing of the pipe connector according to the exemplary embodiment of the present disclosure.

FIG. 7 is a side view of the restricting member of the pipe connector according to the exemplary embodiment of the present disclosure.

DETAILED DESCRIPTION

Figure 1:
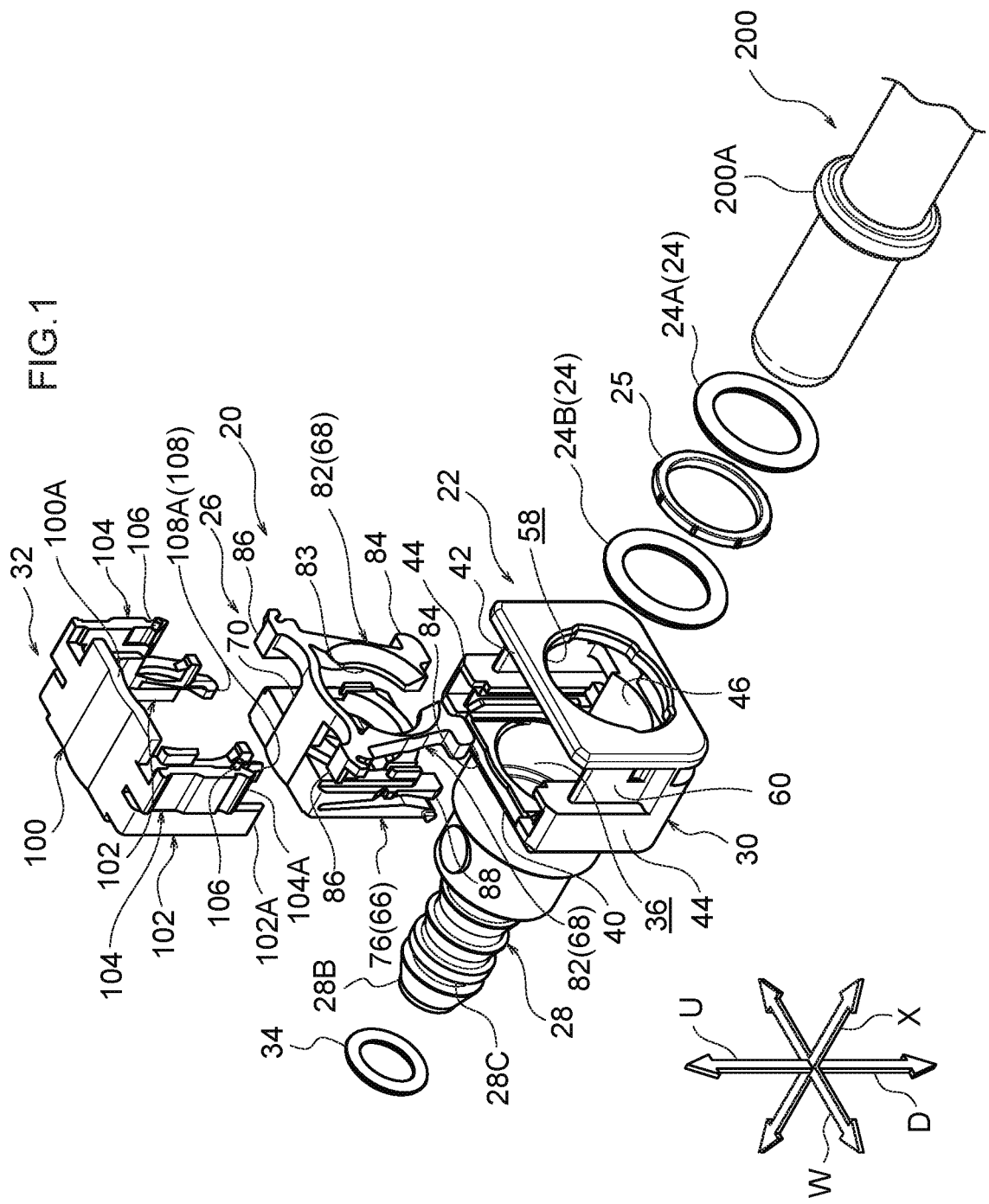
FIG. 1 is an exploded perspective view showing a pipe connector according to an exemplary embodiment of the present disclosure.

A pipe connector according to an exemplary embodiment of the present disclosure will now be described with reference to FIG. 1 through FIG. 10.

<Pipe Connector 20>

A pipe connector 20 of the present exemplary embodiment is a connector having a tube (not shown in the drawings) connected to one side thereof in an axial direction (i.e., a direction indicated by an arrow X in the drawings) thereof, and a pipe 200, which has an annular spool 200A, connected to another side thereof in the axial direction. The tube and the pipe 200 are in mutual communication via this pipe connector 20. Note that the axial direction of the pipe connector 20 is described below where appropriate as a 'connector axial direction'.

The pipe connector 20 of the present exemplary embodiment is used, for example, as a connector for connecting pipes together in an automobile. Note that the pipe connector 20 of the present exemplary embodiment may be used to connect together various types of tubes and pipes having a spool, and is not limited to being used in automobiles. For example, this pipe connector 20 may also be used in vehicles such as aircraft and ships and the like, and in industrial machinery and the like.

As is shown in FIG. 1, the pipe connector 20 is provided with a housing 22, O-rings 24, and a restricting member 26.

(Housing 22)

The housing 22 is an integrally molded article that is formed from a resin material. As is shown in FIG. 1 and FIG. 2, the housing 22 is provided with a circular-cylinder shaped cylinder portion 28 that is provided on one side of the housing 22 in the connector axial direction, and with a box-shaped attachment portion 30 whose upper portion is open and that is provided on another side of the housing 22 in the connector axial direction. Note that, of directions that are orthogonal to the connector axial direction of the pipe connector 20, a direction in which the restricting member 26 and a checker member 32 (described below) are moved so as to be attached to the pipe connector 20 is taken as a downward direction of the pipe connector 20, and is indicated by an arrow D in the drawings. In addition, an upward direction which is opposite this downward direction is indicated by an arrow U in the drawings, while of the directions that are orthogonal to the connector axial direction of the pipe connector 20, a direction that is orthogonal to the upward direction and the downward direction is taken as a connector width direction, and is indicated by an arrow W in the drawings.

[Cylinder Portion 28]

An outer diameter of a distal end portion 28B side (see FIG. 3) of the cylinder portion 28 is narrower than a diameter of a base end portion 28A side (see FIG. 3) thereof that is connected to the attachment portion 30. Moreover, the distal end portion 28B of the cylinder portion 28 is formed in a tapered shape that becomes progressively narrower approaching a distal end thereof, and is able to be easily inserted into the aforementioned tube. In addition, an annular groove 28C that extends in a circumferential direction is formed on the distal end portion 28B side of the cylinder portion 28. An O-ring 34 that is used to provide a seal between an inner circumferential surface of the tube and an outer circumferential surface of the cylinder portion 28 (i.e., a bottom surface of the annular groove 28C) is disposed within this annular groove 28C. When the cylinder portion 28 has been inserted into the tube, an outer circumferential end portion of the O-ring 34 is pressed tightly against the inner circumferential surface of the tube, while an inner circumferential end portion thereof is pressed tightly against the outer circumferential surface of the cylinder portion 28.

An inner diameter of the distal end portion 28B side of the cylinder portion 28 is formed narrower than a diameter of the base end portion 28A side thereof. An insertion hole 36 into which the pipe 200 is inserted is formed inside the cylinder portion 28. More specifically, an internal portion (i.e., an internal space 29) of the cylinder portion 28 is formed having a first internal diameter portion 29A, a second internal diameter portion 29B, and a third internal diameter portion 29C whose respective diameters are progressively smaller in that sequence from the base end portion 28A towards the distal end portion 28B. The insertion hole 36 is formed by the first internal diameter portion 29A and the second internal diameter portion 29B. Note that a diameter of the first internal portion 29A is larger than a diameter of the spool 200A of the pipe 200. Conversely, a diameter of the third internal portion 29C is smaller than an outer diameter of the pipe 200.

[Attachment Portion 30]

The attachment portion 30 is formed, as is described above, in a box-shape having an open upper portion, and is formed so as to enable the restricting member 26 to be inserted from above through this open portion, and to then be attached to the attachment portion 30. This attachment portion 30 has a base portion 38, facing wall portions 40 and 42 that extend upwards respectively from both end portions in the connector axial direction of the base portion 38, and a pair of side wall portions 44 that extend upwards respectively from both end portions in the connector width direction of the base portion 38.

The base portion 38 forms a bottom portion of the attachment portion 30, and a pedestal portion 46 on which are placed lower portions of each of a restricting portion 66 and a holding portion 68 (described below) of the restricting member 26 is formed on a bottom surface of the base portion 38. The pedestal portion 46 is formed so as to extend in the connector axial direction.

[Engaging Portions 48]

Engaging portions 48 (see FIG. 5) which are engaged with a pair of stopper portions 80 of a restricting plate 76 (described below) are provided respectively on both sides in the connector width direction so as to sandwich the pedestal portion 46 of the base portion 38. In addition, engaging portions 50 (see FIG. 5) which are engaged with a pair of stopper portions 92 of a supporting plate 88 (described below) are provided respectively on both sides in the connector width direction so as to sandwich the pedestal portion 46 of the base portion 38, and on the other side in the connector axial direction of the engaging portions 48. These engaging portions 48 and 50 may be formed either as recessed portions or as hole portions provided that they are able to be engaged with the stopper portions 80 and 92, however, in the present exemplary embodiment, the engaging portions 48 and 50 are formed as hole portions.

Engaging portions 52 (see FIG. 5) which are engaged with distal end portions 102A of a pair of leg portions 102 of the checker member 32 (described below) are provided respectively further to the outer sides in the connector width direction than the pair of engaging portions 48 and 50 of the base portion 38. In addition, engaging portions 54 (see FIG. 5) which are engaged with distal end portions 108A of a pair of leg portions 108 (described below) are provided respectively on both sides in the connector width direction so as to sandwich the pedestal portion 46 of the base portion 38, and on the other side in the connector axial direction of the engaging portions 50. These engaging portions 52 and 54 may be formed either as recessed portions or as hole portions provided that they are able to be engaged with the distal end portions 102A and 108A of the leg portions 102 and 108, however, in the present exemplary embodiment, the engaging portions 52 and 54 are formed as hole portions.

Furthermore, insertion portions 55 (see FIG. 5) into which are inserted free ends 82B of holding plates 82 (described below) are provided respectively further to the other side in the connector axial direction than the pedestal portion 46 of the base portion 38. The length in the connector width direction of the insertion portions 55 is set so as to be longer than the width of the free ends 82B. In contrast, the length in the connector axial direction of the insertion portions 55 is set so as to be substantially the same as the length (i.e., the thickness) in the connector axial direction of the free ends 82B.

Note that, when viewed from above the connector, the base portion 38 of the present exemplary embodiment has left-right symmetry on either side of a center line extending in the connector axial direction of the insertion hole 36.

The facing wall portion 40 is disposed so as to face towards the facing wall portion 42 in the connector axial direction. In addition, the base end portion 28A of the cylinder portion 28 is connected to one side in the connector axial direction of the facing wall portion 40. A through hole 56 is formed in the facing wall portion 40 so as to be coaxial with the cylinder portion 28. In the present exemplary embodiment, a diameter of the through hole 56 is the same as the diameter of the first inner diameter portion 29A of the cylinder portion 28.

In addition, a through hole 58 is formed in the facing wall portion 42 so as to be coaxial with the through hole 56 in the facing wall portion 40. In the present exemplary embodiment, a diameter of the through hole 58 is the same as the diameter of the through hole 56.

Note that, when viewed from the connector axial direction, the facing wall portion 40 of the present exemplary embodiment has left-right symmetry on either side of a straight line passing through the center line and extending in the connector up-down direction.

In the same way, the facing wall portion 42 also has left-right symmetry on either side of the aforementioned straight line when viewed from the connector axial direction.

Recessed portions 60 that are engaged with a pair of leg portions 104 of the checker member 32 are provided respectively in each outer surface of the pair of side wall portions 44. Moreover, guide grooves 62 that extend in the connector up-down direction are provided respectively in each inner surface of the pair of side wall portions 44. A groove wall surface 64 on one side in the connector axial direction of these guide grooves 62 forms a guide surface that guides guide projections 78 of the restricting plate 76 (described below). A groove entry side (i.e., an upper side in FIG. 8) of the groove guide surface 64 is formed as an inclined portion 64A that slopes from one side in the connector axial direction towards the other side thereof. An intermediate portion of the groove guide surface 64 is formed as a straight-line portion 64B that extends in the connector up-down direction, and a groove exit side (i.e., a lower side in FIG. 8) of the groove guide surface 64 is formed as an inclined portion 64C that slopes from one side in the connector axial direction towards the other side thereof. Note that a structure is employed in which, when the guide projections 78 protrude from the groove exit of the guide grooves 62, the stopper portions 80 of the restricting plate 76 engage with the engaging portion 48.

Note also that, when viewed from the connector axial direction, the side wall portions 44 of the present exemplary embodiment have left-right symmetry on either side of the aforementioned straight line passing through the center line and extending in the connector up-down direction.
(O-rings 24)

As is shown in FIG. 1, the O-rings 24 are disposed within the insertion hole 36 in the cylinder portion 28, and provide a seal between the outer circumferential surface of the pipe 200 that is inserted into the insertion hole 36 and the inner circumferential surface of the insertion hole 36. More specifically, two O-rings 24 are disposed within the first inner diameter portion 29A of the cylinder portion 28. A spacer 25 is disposed between these O-rings 24 so that the two O-rings do not come into contact with each other. Note that, in the following description, of the two O-rings 24, the O-ring on the entry side (i.e., on the other side in the connector axial direction) of the insertion hole 36 is indicated by the symbol 24A, while the O-ring on the further side (i.e., on the one side in the connector axial direction) of the insertion hole 36 is indicated by the symbol 24B.

When the pipe 200 has been inserted inside the insertion hole 36, the respective inner circumferential end portions of the O-rings 24A and 24B are pressed tightly against the outer circumferential surface of the pipe 200, while the respective outer circumferential end portions thereof are pressed tightly against the inner circumferential surface of the insertion hole 36 (i.e., against the first inner diameter portion 29A).
(Restricting Member 26)

As is shown in FIG. 1, the restricting member 26 is able to be attached to the attachment portion 30 from the outer side in the radial direction of the pipe 200. More specifically, a structure is employed in which the restricting member 26 is attached to the attachment portion 30 by being inserted from above through the open portion in the attachment portion 30.

The restricting member 26 has the restricting portion 66 and the holding portion 68. An upper portion of the restricting portion 66 and an upper portion of the holding portion 68 are joined together by means of a joining portion 70 which extends in the connector axial direction. Note that the restricting portion 66 is positioned further to the one side in the connector axial direction than the holding portion.

The restricting portion 66 is formed such that, when the restricting portion 66 pressed from the outer side in the radial direction of the pipe 200 towards the inner side in the radial direction of the pipe 200, the restricting portion 66 bends towards an opposite side (i.e., towards the other side in the connector axial direction) from an insertion direction of the pipe 200, and when the restricting member 26 has been completely attached to the attachment portion 30, the restricting portion 66 elastically returns so as to restrict movement of the O-rings 24A and 24B towards the opposite side (hereinafter, referred to as a 'withdrawal direction') from the insertion direction of the pipe 200. More specifically, the restricting portion 66 has the restricting plate 76 that is supported in a cantilever fashion by the joining portion 70 and in which an annular portion 74 that is able to abut against the O-ring 24A is formed around a through hole 72 through which the pipe 200 is inserted, and the guide projections 78 that protrude from side portions of the restricting plate 76, and move along the guide grooves 62, and cause the restricting plate 76 to bend in the withdrawal direction.
[Restricting Plate 76]

Figure 3:
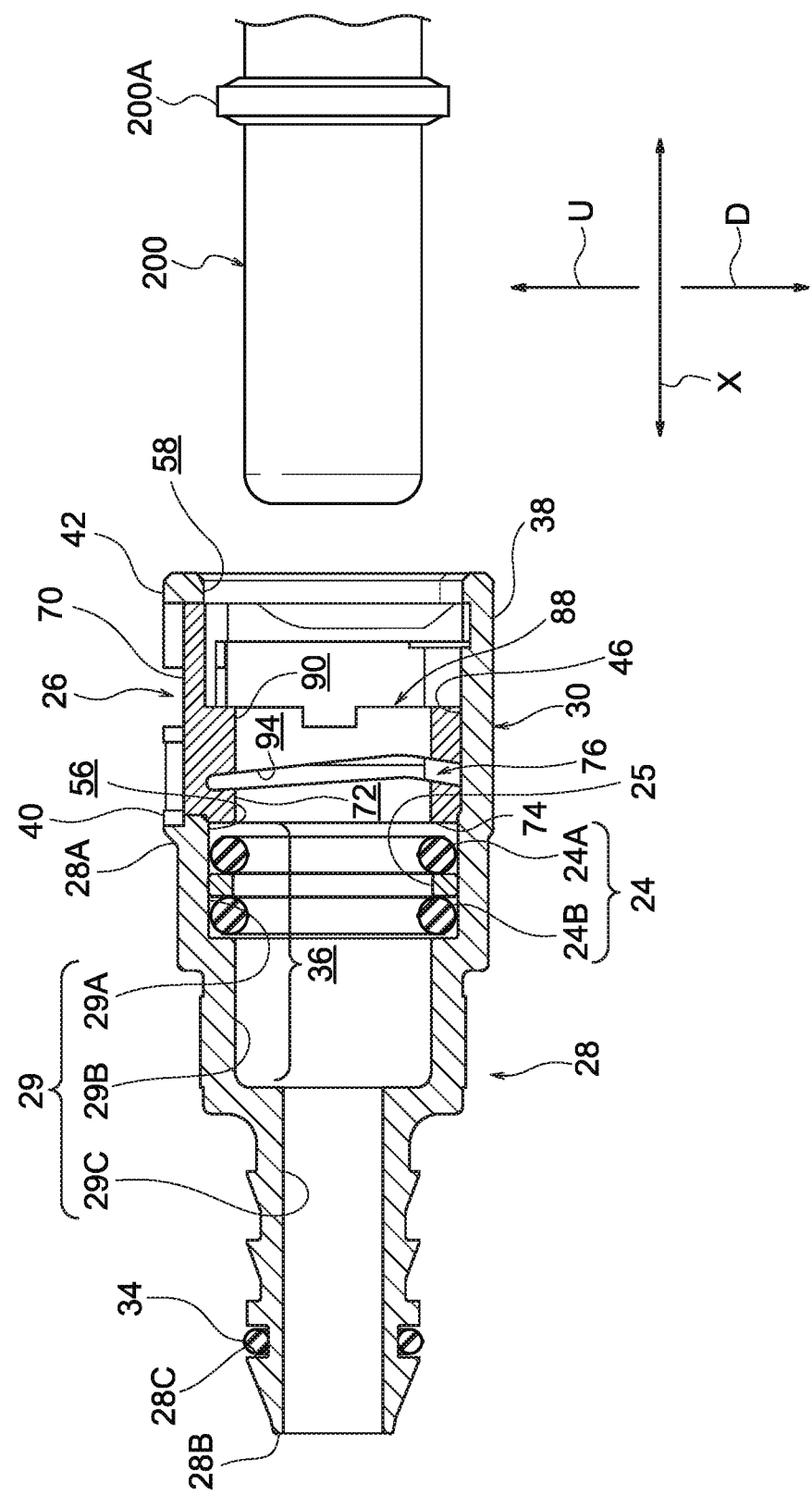
FIG. 3 is a cross-sectional view showing in a state prior to a checker member being attached to the pipe connector according to the exemplary embodiment of the present disclosure.
Figure 4:
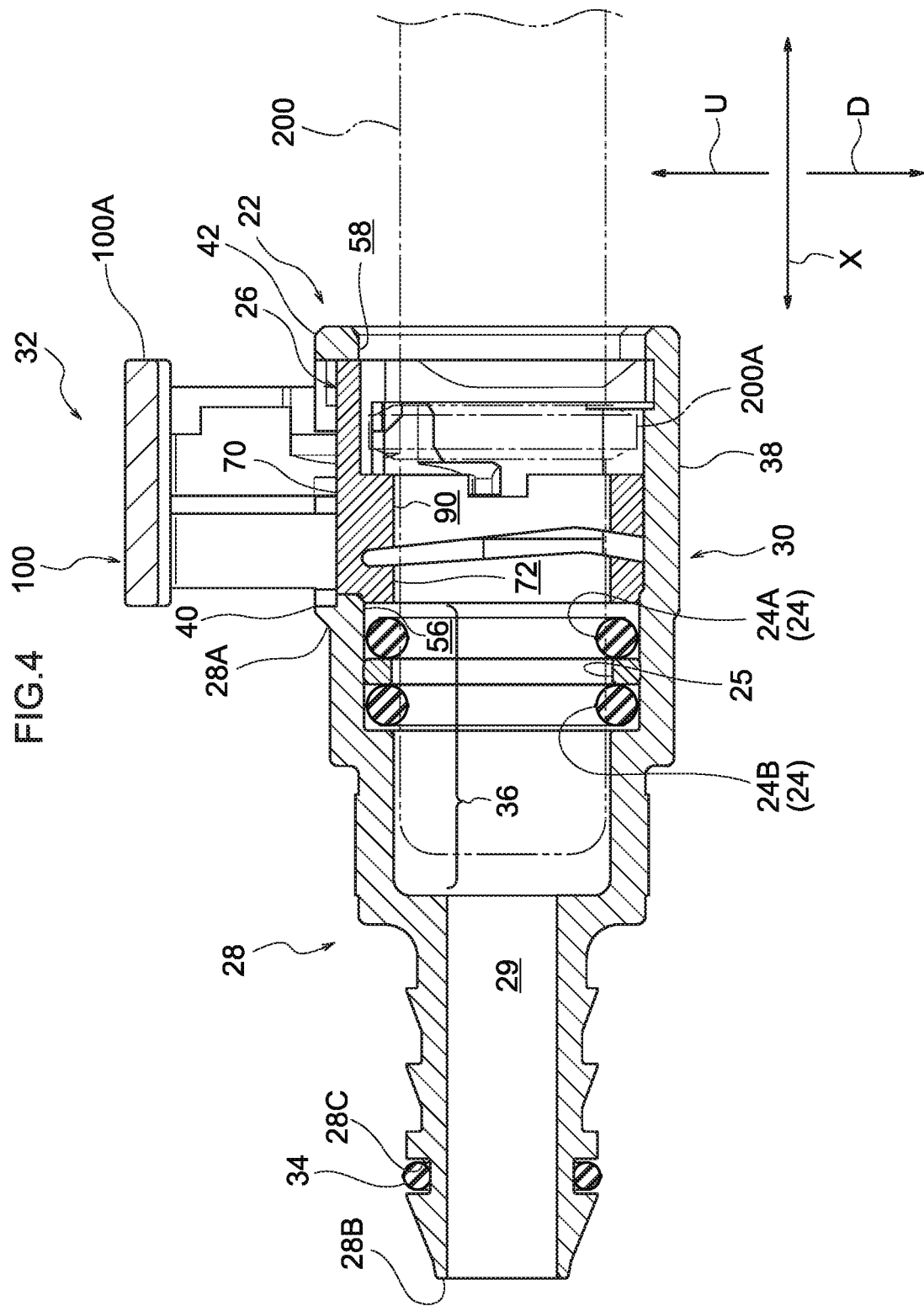
FIG. 4 is a cross-sectional view showing in a state in which the checker member has been attached to a temporary attachment position in the pipe connector according to the exemplary embodiment of the present disclosure.
Figure 5:
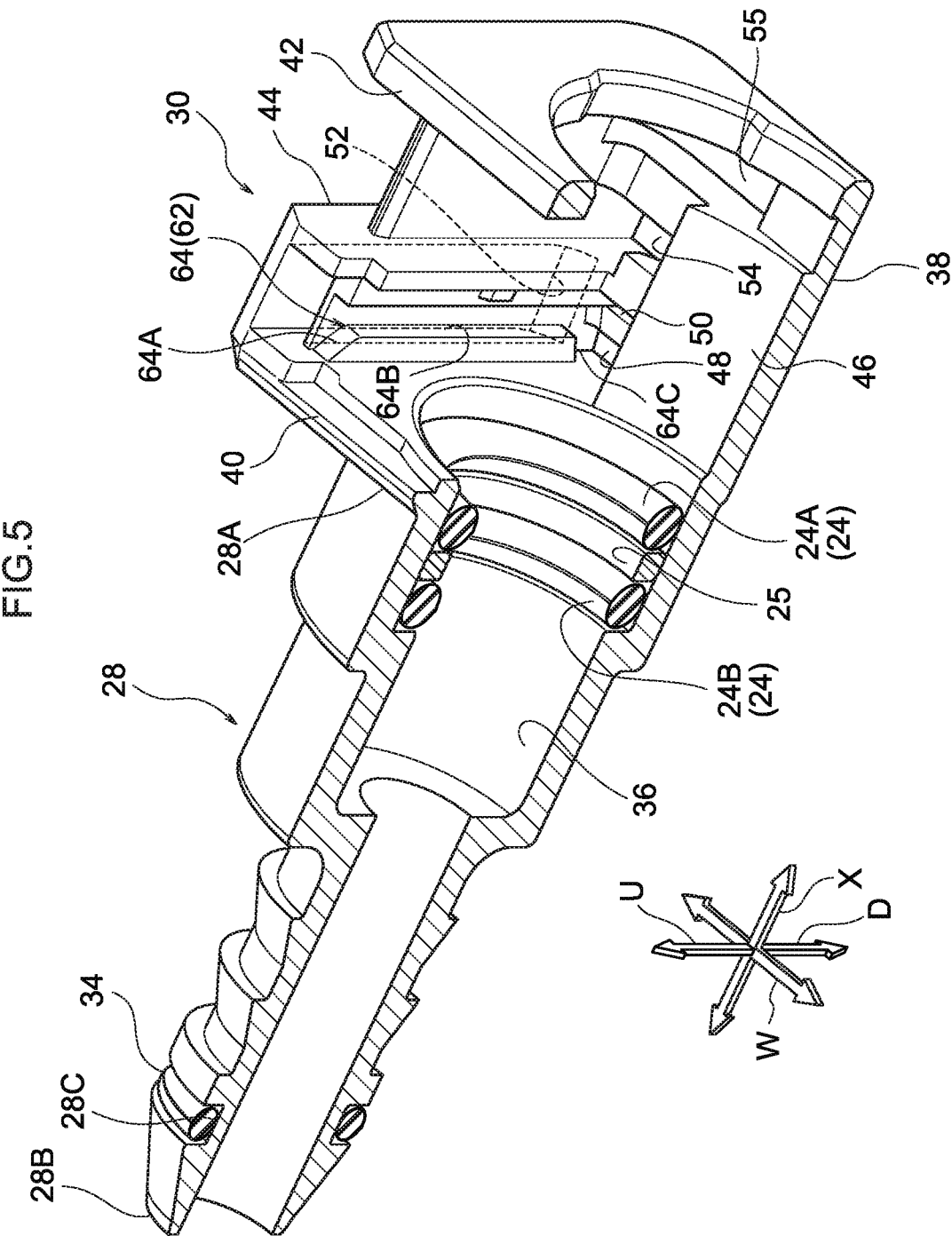
FIG. 5 is a cross-sectional perspective view of a housing of the pipe connector according to the exemplary embodiment of the present disclosure.
Figure 10:
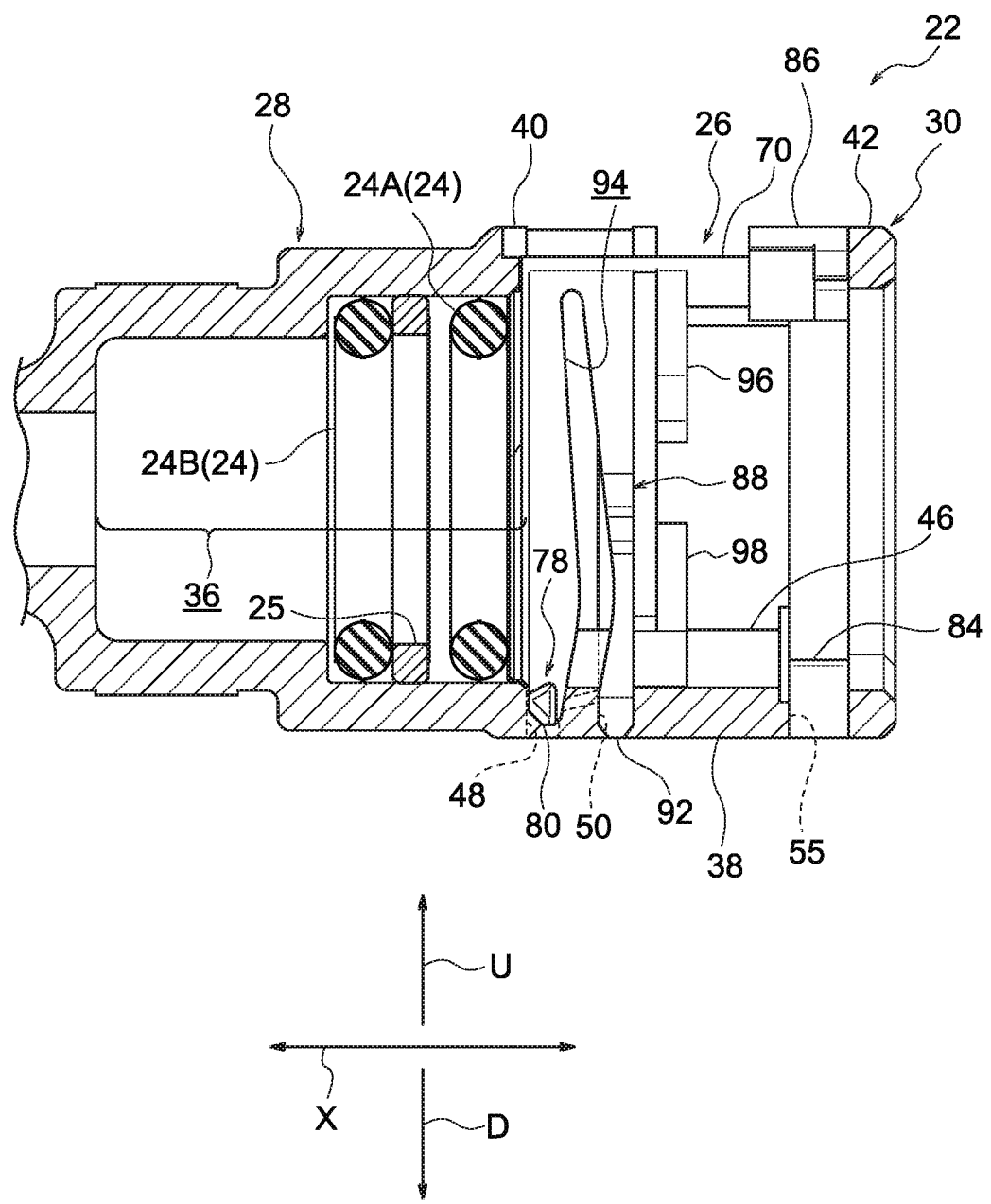
FIG. 10 is a cross-sectional view showing in a state in which the restricting member has been completely attached to the housing of the pipe connector according to the exemplary embodiment of the present disclosure.

The through hole 72 is formed in the restricting plate 76 in a position that enables the pipe 200 to be inserted therethrough when the restricting member 26 has been attached to the attachment portion 30 (which is the same state as in a state in which the restricting member 26 has been completely attached to the attachment portion 30). The ring-shaped annular portion 74 is provided around an edge portion on the one side in the connector axial direction of the through hole 72. As is shown in FIG. 3 and FIG. 10, in a state in which the restricting member 26 is attached to the attachment portion 30, is also in a state in which the annular ring 74 is inserted into the insertion hole 36. Moreover, in the present exemplary embodiment, the annular ring 74 is formed in a tapered shape which becomes progressively narrower from the base end towards the distal end thereof, and can therefore be easily inserted into the insertion hole 36. Note, however, that the present disclosure is not limited to the above-described structure.

[Stopper Portions 80]

Stopper portions 80 that protrude downwards are provided respectively at both end sides in the connector width direction on a free end side (i.e., on a lower side in FIG. 6 and FIG. 7) of the restricting plate 76. These stopper portions 80 are engaged respectively with the engaging portions 48 of the base portion 38 in a state in which the restricting member 26 is attached to the attachment portion 30.

[Guide Projections 78]

Figure 8:
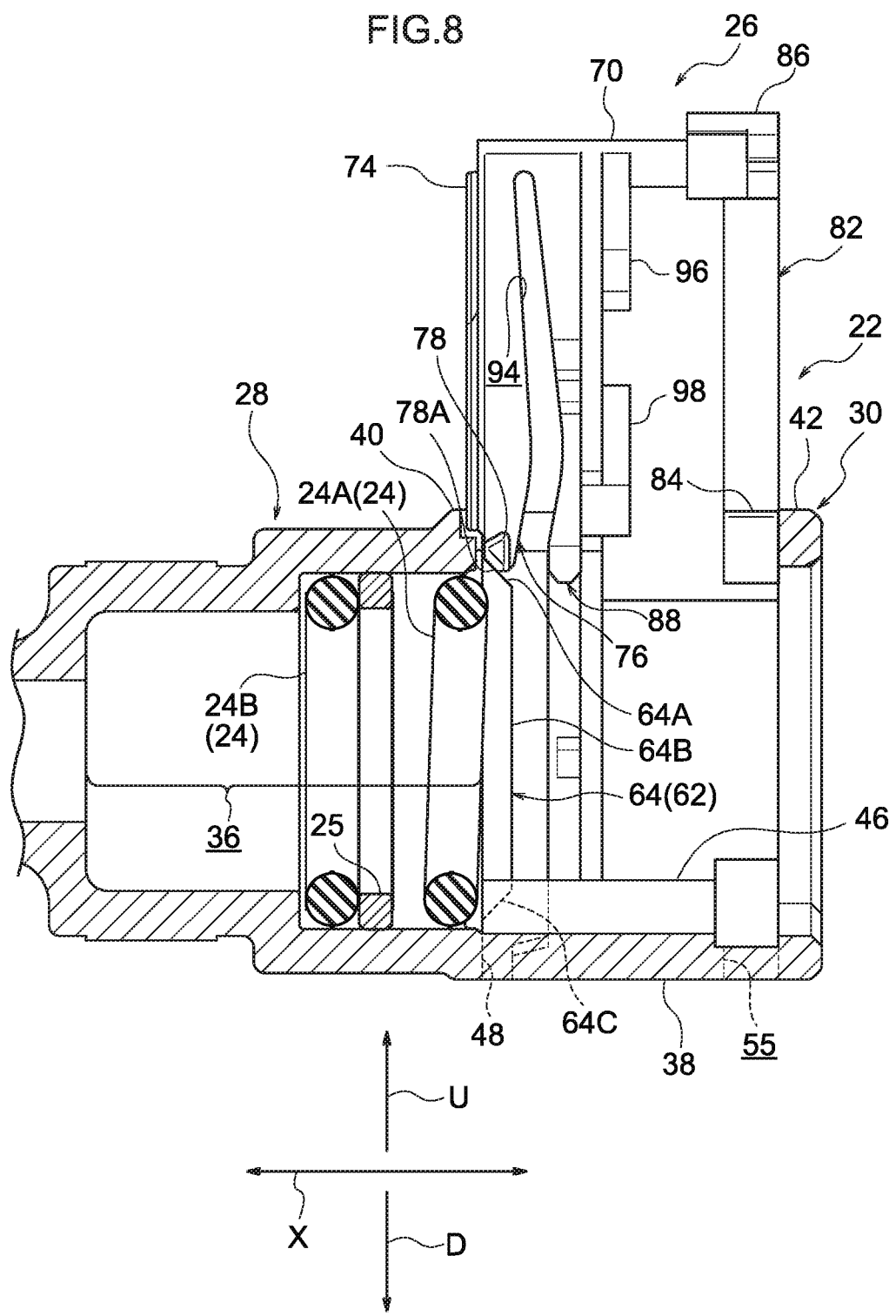
FIG. 8 is a cross-sectional view showing in a state in which the restricting member is being attached to the housing of the pipe connector according to the exemplary embodiment of the present disclosure.

The guide projections 78 protrude from side surfaces of the stopper portions 80 forming part of the side portions of the restricting plate 76. When looked at from the connector width direction, these guide projections 78 are formed in a substantially triangular shape. As is shown in FIG. 8, the guide projections 78 are formed such that an inclined surface 78A thereof is substantially parallel with the inclined portion 64A of the guide grooves 62. Note, however, that the present disclosure is not limited to the above-described structure. For example, the guide projections 78 may instead be formed as circular shapes (including true circles and elliptical shapes), or as trapezoidal shapes whose short side faces downwards when looked at from the connector width direction. In other words, any type of structure may be employed provided that the structure enables the inclined surface or curved surface of the guide projections of the present disclosure to abut against the inclined portion 64A of the guide grooves 62.

The holding portion 68 is formed so as to be able to engage with the spool 200A of the pipe 200 and thereby restrict movement of the pipe 200 in the withdrawal direction. This holding portion 68 has a pair of holding plates 82 that extend downwards from the joining portion 70. The holding plates 82 are supported in a cantilever fashion by the joining portion 70. A gap 83 formed between the pair of holding plates 82 and the joining portion 70 is substantially circular when looked at from the connector axial direction, and is large enough for the pipe 200 to pass through the gap 83, while being too small for the spool 200A to pass through. When the pipe 200 is passed through the gap 83, the spool 200A abuts against inner circumferential portions 82A of the respective holding plates 82, and the respective holding plates 82 are subsequently deformed such that the free ends 82B of the pair of holding plates 82 move away from each other. After the spool 200A has passed between the holding plates 82, the respective holding plates 82 elastically return.

Figure 6:
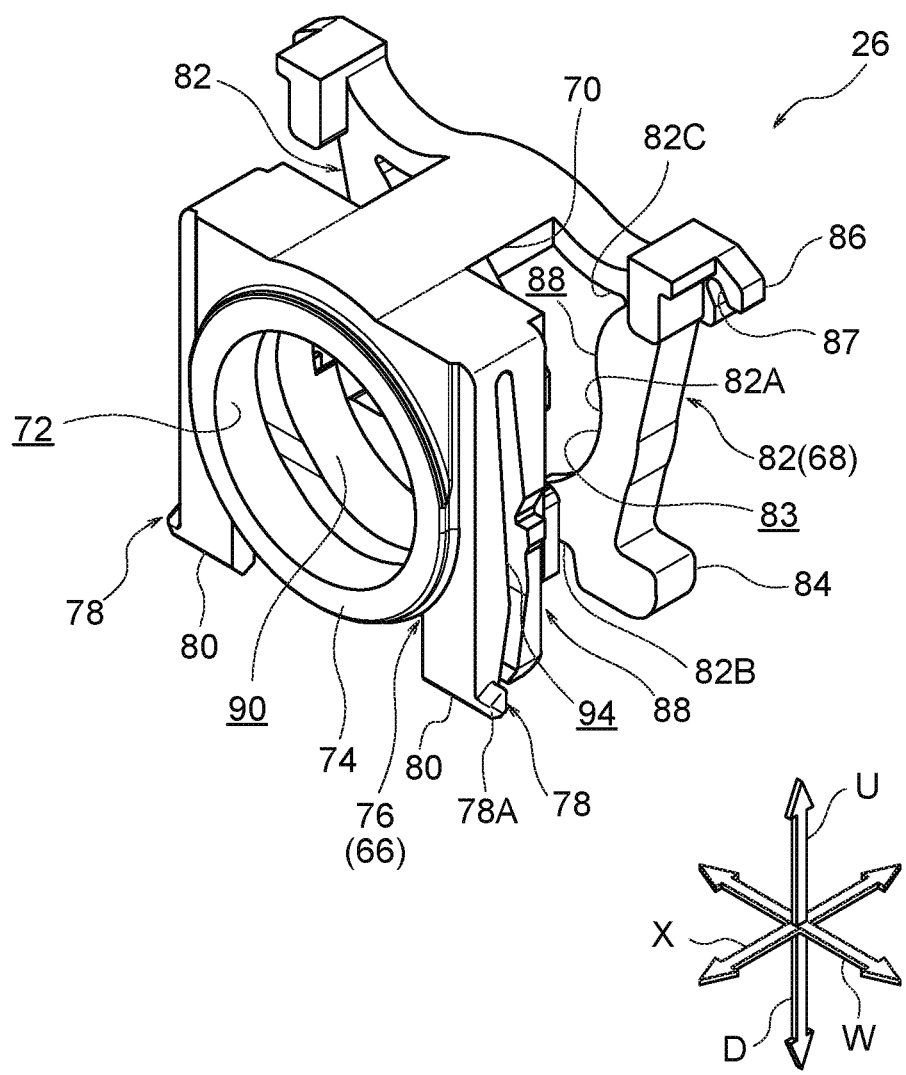
FIG. 6 is a perspective view of a restricting member of the pipe connector according to the exemplary embodiment of the present disclosure.

As is shown in FIG. 6, protruding portions 84 that protrude on the lower side and towards the outer side in the connector axial direction are provided on the free end 82B side of each holding plate 82. When the restricting member 26 has been attached to the attachment portion 30, these protruding portions 84 are inserted into the insertion portion 55 of the base portion 38.

Protruding portions 86 that protrude on the upper side and towards the outer side in the connector axial direction are provided on the base end 82C side of each holding plate 82. An end portion 100A on the other side in the connector axial direction of a cover portion 100 (described below) of the checker member 32 is able to be inserted between the respective protruding portions 86 of the pair of holding plates 82 while leaving a slight gap between itself and the protruding portions 86. In addition, catch portions 87 that catch pins 106 (described below) of the checker member 32 are provided on the outer side in the connector width direction of the protruding portions 86.

[Supporting Plate 88]

The restricting member 26 also has a supporting plate 88 between the restricting plate 76 and the holding plates 82 in the connector axial direction. The supporting plate 88 is supported in a cantilever fashion by the joining portion 70, and is formed having a through hole 90 through which the pipe 200 is inserted that is coaxial with the through hole 72. Stopper portions 92 that protrude downwards are provided respectively at both end sides in the connector width direction on a free end side (i.e., on a lower side in FIG. 6 and FIG. 7) of the supporting plate 88. These stopper portions 92 are engaged respectively with the engaging portions 50 of the base portion 38 when the restricting member 26 has been attached to the attachment portion 30.

Figure 9:
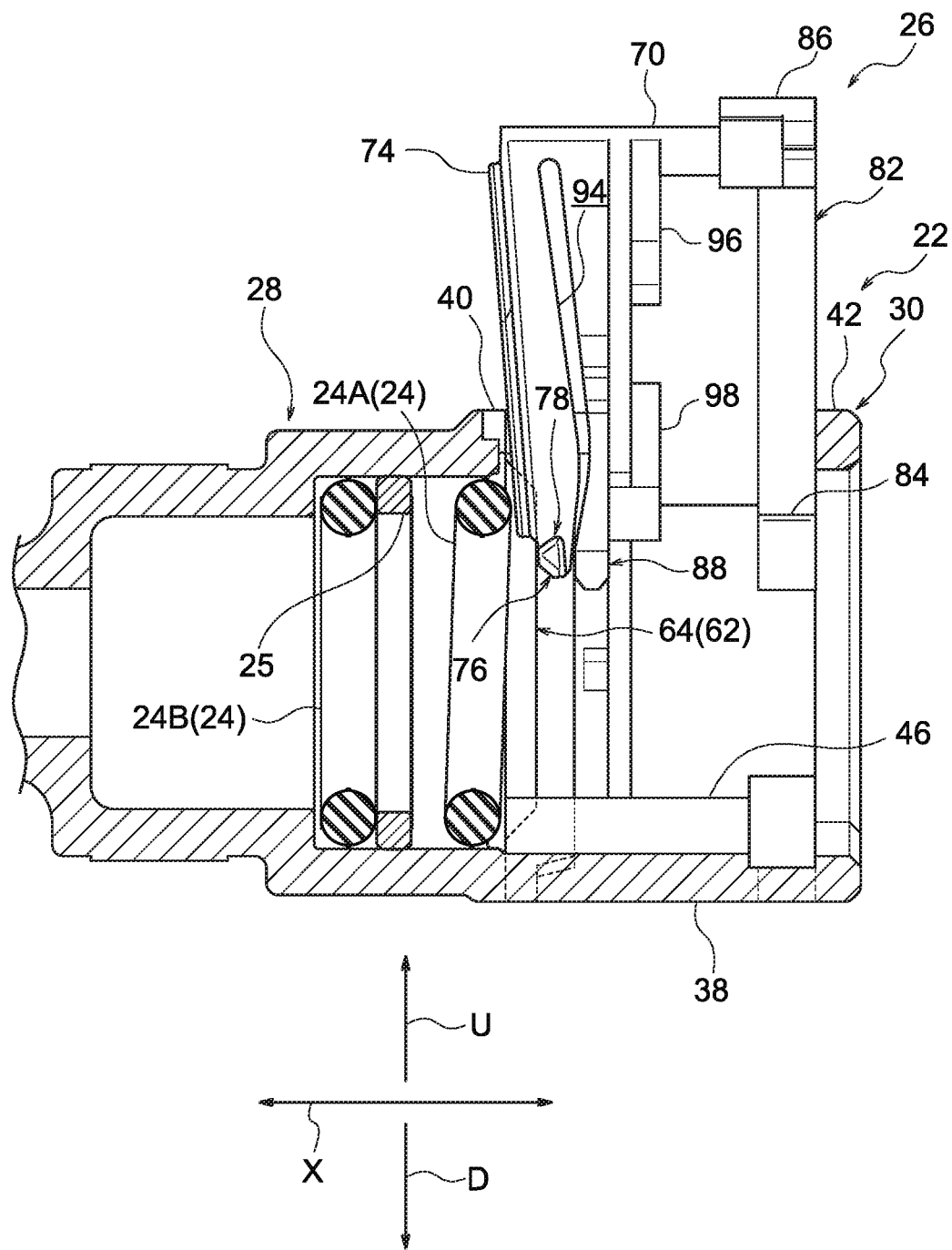
FIG. 9 is a cross-sectional view showing in a state in which the restricting member has been partially attached to the housing of the pipe connector according to the exemplary embodiment of the present disclosure.

As is shown in FIG. 6 and FIG. 7, a gap 94 having a horizontal-V shape when looked at from the connector width direction is formed between the restricting plate 76 and the supporting plate 88. More specifically, the gap 94 slopes towards the opposite side from the insertion direction of the pipe 200 from the upper side in the connector up-down direction towards an intermediate portion, and then bends in the opposite direction partway along its length so as to slope towards the insertion direction side of the pipe 200 from the intermediate portion towards the lower side. Here, if external force is applied from the free end side to the restricting plate 76, then as is shown in FIG. 9, the restricting plate 76 bends (i.e., performs a bending deflection) towards the opposite side from the insertion direction of the pipe 200 around the base end thereof (i.e., around the portion thereof that is connected to the joining portion 70). Note that, in the present exemplary embodiment, when viewed from the connector width direction, the gap 94 is seen to be formed in a horizontal-V shape, however, the present disclosure is not limited to this structure. For example, the gap 94 may instead be formed in a circular-arc shape when viewed from the connector width direction. By forming the gap 94 in a horizontal-V shape or a circular-arc shape in this way, sufficient thickness can be ensured in the portion of the restricting plate 76 to which force in the withdrawal direction is applied from the pipe 200. In addition, the amount of bending of the free end of the restricting plate 76 can be increased.

A protruding portion 96 that protrudes towards the other side in the connector axial direction is provided on an upper edge portion of the through hole 90 in the supporting plate 88. This protruding portion 96 is formed in a circular-arc shape that follows the upper edge portion. In addition, a protruding portion 98 that protrudes towards the other side in the connector axial direction is provided on a lower edge portion of the through hole 90 in the supporting plate 88. This protruding portion 98 is formed in a circular-arc shape that follows the lower edge portion.

(Checker Member 32)

As is shown in FIG. 1, the checker member 32 is attached to the housing 22 from the same direction as the restricting member 26. More specifically, the checker member 32 is attached from above to the restricting member 26 that is attached to the housing 22.

The checker member 32 has the plate-shaped cover portion 100 that extends in the connector axial direction, the pair of plate-shaped leg portions 102 that extend downwards from both end sides in the connector width direction of the cover portion 100, and the pair plate-shaped of leg portions 104 that are disposed further to the other side in the connector axial direction than the pair of leg portions 102, and extend downwards from both end sides in the connector width direction of the cover portion 100.

The cover portion 100 is formed so as to cover the join portion 70 of the restricting member 26 from above in a state in which the checker member 32 has been completely attached to the housing 22.

The pair of leg portions 102 are formed such that, in a state in which the checker member 32 has been completely attached to the housing 22, the distal end portions 102A thereof are engaged respectively with the pair of engaging portions 52 of the base portion 38.

The pair of leg portions 104 are formed so as to be engaged with the recessed portions 60 formed in the side wall portions 44 in a state in which the checker member 32 has been completely attached to the housing 22. In addition, the pins 106 that protrude towards the other side in the connector axial direction are provided in the distal end portions 104A of the pair of leg portions 104. These pins 106 are caught by the catch portions 87 of the holding plates 82.

The leg portions 108 that extend downwards are provided respectively at each root portion of the pair of legs 104. The pair of leg portions 108 are formed such that, in a state in which the checker member 32 has been completely attached to the housing 22, the respective distal end portions 108A are engaged respectively with the pair of engaging portions 54 of the base portion 38.

Next, a procedure to assemble the pipe connector 20 of the present exemplary embodiment will be described.

Firstly, the O-rings 24 (i.e., the O-ring 24A and the O-ring 24B) and the spacer 25 are disposed within the insertion hole 36 of the housing 22. In addition, the O-ring 34 is disposed within the annular groove 28C formed in the cylinder portion 28 of the housing 22.

Next, the restricting member 26 is attached from above to the attachment portion 30. Here, as is shown in FIG. 8, when the inclined surfaces 78A of the guide projections 78 of the restricting member 76 have been abutted against the inclined portions 64A of the groove wall surfaces 64 of the guide grooves 62, if the restricting member 26 is then pushed downwards, the guide projections 78 move downwards from the inclined portions 64A along the straight-line portion 64B. At this time, the free end side of the restricting plate 76 bends towards the opposite side from the insertion direction of the pipe 200 (see FIG. 9). When the guide projections 78 reach the inclined portion 64C, the restricting member 76 elastically returns, so that the pair of stopper portions 80 provided at the free end side of the restricting plate 76 are engaged respectively with the engaging portions 48 of the base portion 38 (see FIG. 10). Additionally, the pair of protruding portions 84 of the holding plate 82 are inserted respectively into the insertion portions 55 of the base portion 38, and the pair of stopper portions 92 of the supporting plate 88 are engaged respectively with the engaging portions 50 of the base portion 38.

Next, the checker member 32 is attached from above to the attachment portion 30 of the housing 22. At this time, the checker member 32 is held in a temporary attachment position (see FIG. 4). In this way, the pipe connector 20 is assembled.

Next, a procedure for installing the pipe connector 20 of the present exemplary embodiment will be described.

Firstly, the cylinder portion 28 of the pipe connector 20 whose assembly is described above is inserted into a tube (not shown in the drawings).

Next, an end portion of the pipe 200 is inserted into the insertion hole 36 in the housing 22. Here, when the spool 200A abuts against the respective inner circumferential portions 82A of the pair of holding plates 82, the gap 83 becomes wider so that the spool 200A is able to pass therethrough. After the spool 200A has passed through, the pair of holding plates 82 elastically return. Consequently, the O-rings 24 are pressed tightly against the outer circumferential surface of the pipe 200 inserted into the insertion hole 36, and a seal is thereby formed between the inner circumferential surface of the insertion hole 36 and the outer circumferential surface of the pipe 200.

Next, the checker member 32 is pressed downwards from the temporary attachment position so as to be moved to the attachment position. when the checker member 32 has been completely attached to the housing 22, the distal end portions 102A of the pair of leg portions 102 are engaged respectively with the engaging portions 52, and the distal end portions 108A of the pair of leg portions 108 are engaged respectively with the engaging portions 54. At this time, the end portion 100A of the cover portion 100 is positioned between the respective protruding portions 86 of the pair of holding plates 82, so that the deformation of the pair of holding plates 82 (in other words, the deformation generated by the widening of the gap 83) is restricted. As a consequence, the movement of the spool 200A in the withdrawal direction is restricted by the pair of holding plates 82.

Next, actions and effects of the pipe connector 20 of the present exemplary embodiment will be described.

In the pipe connector 20, when the restricting member 26 is being attached to the attachment portion 30 of the housing 22, if the restricting member 26 is pressed against the housing 22 towards the inner side from the outer side in the radial direction of the pipe, the restricting plate 76 forming part of the restricting portion 66 bends towards the opposite side from the insertion direction of the pipe 200. In other words, because the restricting plate 76 bends towards the side in which it is moving away from the O-ring 24A, even if the O-ring 24A protrudes from the insertion aperture of the insertion hole 36, the restricting plate 76 does not come into contact with the O-ring 24A, and the restricting member 26 can be attached to the housing 22. Once the restricting member 26 has been attached to the housing 22 (i.e., once the attachment operation has been completed), the restricting plate 76 elastically returns, and the O-ring 24A that was protruding from within the insertion hole 36 is pressed back inside the insertion hole 36, and movement of the O-ring 24A towards the opposite side from the insertion direction of the pipe (in other words, movement of the O-ring in the direction of withdrawal from inside the insertion hole) is restricted.

According to the pipe connector 20, when the operation to attach the restricting member 26 to the housing 22 is being performed, even if the O-ring 24A is protruding from the insertion aperture of the insertion hole 36, because the restricting plate 76 bends towards the side moving away from the O-ring 24A, it is possible to inhibit any malfunction of the O-ring 24A from occurring. Moreover, the restricting member 26 can be attached to the housing 22 via a simple operation that involves simply pressing the restricting member 26 towards the inner side from the outer side in the radial direction of the pipe 200 (in the present exemplary embodiment, this pressing is from the upper side towards the lower side) against the housing 22.

In addition, in the pipe connector 20, the pair of holding plates 82 which are serving as the holding portion 68 of the restricting member 26 are engaged with the spool 200A of the pipe 200, thereby causing movement towards the opposite side from the insertion direction of the pipe 200 to be restricted. Here, in the above-described pipe connector 20, because the restricting member 26 is provided with the restricting portion 66 and the holding portion 68, compared with a structure in which, for example, the restricting member 26 has the restricting portion 66, and another component has the holding portion 68, movement of the O-ring 24A and the spool 200A in the withdrawal direction thereof can be restricted by performing a single attachment operation.

Additionally, in the pipe connector 20, if the restricting member 26 is pressed towards the inner side from the outer side in the radial direction of the pipe 200 against the housing 22, the guide projections 78 which protrude from side portions of the restricting plate 76 move along the guide groves 62 formed on the inner side of the housing 22, so that the restricting plate 76 bends towards the opposite side from the insertion direction of the pipe 200. Here, in the above-described pipe connector 20, the restricting plate 76 can be made to bend towards the opposite from the insertion direction of the pipe 200 by means of a simple structure that uses the guide grooves 62 and the guide projections 78.

Furthermore, in the pipe connector 20, once the restricting member 26 has been completely attached to the housing 22, because the annular portion 74 is inserted into the insertion hole 36 in the housing 22, compared with a structure, for example, in which the annular portion 74 is not inserted into the insertion hole 36, or in which the annular portion 74 is abutted against the edge portion of the insertion hole 36, an improvement in the filling rate of the O-rings 24 in relation to the space provided for installing the O-rings 24 is achieved. As a consequence, the quality of the seal provided by the O-rings 24 between the housing 22 and the pipe 200 is improved.

Moreover, in the above-described pipe connector, once the restricting member 26 has been completely attached to the housing 22, because the stopper portions 80 provided on the free end side of the restricting plate 76 engage with the engaging portions 48 of the housing 22, the bending of the restricting plate 76 in the insertion direction of the pipe 200 and towards the opposite side from this insertion direction is restricted. As a consequence, in the above-described pipe connector 20, for example, once the restricting member 26 has been completely attached to the housing 22, compared with a structure in which the bending of the restricting plate 76 in the insertion direction of the pipe 200 and towards the opposite side from this insertion direction is not restricted, the quality of the seal provided by the O-rings 24 is kept stable.

In the above-described exemplary embodiment, a structure is employed in which the restricting member 26 is provided with the restricting portion 66 and the holding portion 68, however, the present disclosure is not limited to this structure. For example, it is possible to instead employ a structure in which the restricting member 26 is provided with the restricting portion 66, and another component attached to the housing 22 is provided with the holding portion 68.

Moreover, in the above-described exemplary embodiment, a structure is employed in which the guide projections 78 are provided on the restricting plate 76, and the guide grooves 62 are provided on the inner side (i.e., in an inner surface of a side wall portion) of the housing 22, however, the present disclosure is not limited to this structure. For example, it is possible to instead employ a structure in which guide projections are provided on the inner side (i.e., on an inner surface of a side wall portion) of the housing 22, and guide grooves are provided in a side surface of the restricting plate 76.

An exemplary embodiment of the present disclosure has been described and illustrated above, however, the above-described embodiment is merely one example thereof, and various modifications and the like may be made thereto insofar as they do not depart from the spirit or scope of the present disclosure. In addition, it is to be understood that the scope of rights of the present disclosure is not limited to the present exemplary embodiment.

The following additional notes may also be disclosed in relation to the above-described exemplary embodiment.

(Additional Note 1)

A pipe connector comprising:

a housing in which an insertion hole is formed, a pipe having an annular spool being inserted into the insertion hole;

at least one O-ring that is disposed inside the insertion hole, and that forms a seal between an inner circumferential surface of the insertion hole and an outer circumferential surface of the pipe;

a restricting member that is attached to the housing from an outer side in a radial direction of the pipe; and a restricting portion that is provided at the restricting member, wherein the restricting portion bends towards an opposite side from an insertion direction of the pipe when the restricting member is pressed from the outer side in the radial direction of the pipe towards an inner side in the radial direction of the pipe, and elastically returns so as to restrict movement of the at least one O-ring towards the opposite side from the insertion direction of the pipe when the restricting member has been attached to the housing completely.

In the pipe connector of Additional Note 1, when the restricting member is being attached to the housing, if the restricting member is pressed towards the inner side from the outer side in the radial direction of the pipe against the housing, the restricting portion bends towards the opposite side from the insertion direction of the pipe. In other words, because the restricting portion bends towards the side in which it is moving away from the at least one O-ring, even if the at least one O-ring protrude from the insertion aperture of the insertion hole, the restricting portion does not come into contact with the at least one O-ring, and the restricting member is attached to the housing. Once the restricting member has been attached to the housing (i.e., once the restricting member has been completely attached to the housing), the restricting portion elastically returns, and the at least one O-ring that was protruding from within the insertion hole are pressed back inside the insertion hole, and movement of the at least one O-ring towards the opposite side from the insertion direction of the pipe (in other words, movement of the at least one O-ring in the direction of withdrawal from inside the insertion hole) is restricted.

According to the above-described pipe connector, when the operation to attach the restricting member to the housing is being performed, even if the at least one O-ring is protruding from the insertion aperture of the insertion hole, because the restricting portion bends towards the side moving away from the at least one O-ring, any malfunction of the at least one O-ring is inhibited from occurring. Moreover, the restricting member can be attached to the housing via a simple operation that involves simply pressing the restricting member towards the inner side from the outer side in the radial direction of the pipe against the housing.

(Additional Note 2)

The pipe connector according to Additional Note 1, in which the restricting member additionally has a holding portion that engages with the spool of the pipe so as to restrict movement towards the opposite side from the insertion direction of the pipe.

In the pipe connector of Additional Note 2, a holding portion of the restricting member engages with the spool of the pipe so as to restrict movement towards an opposite side from the insertion direction of the pipe. Here, in the above-described pipe connector, because the restricting member is provided with the restricting portion and the holding portion, compared with a structure in which, for example, the restricting member has the restricting portion, and another component has the holding portion, movement of the at least one O-ring and the spool in the withdrawal direction thereof can be restricted by performing a single attachment operation.

(Additional Note 3)

The pipe connector according to Additional Note 1 or Additional Note 2, in which the restricting portion is provided with: a restricting plate that is supported in a cantilever fashion and in which is formed a through hole through which the pipe is inserted; and a guide projection that protrudes from a side portion of the restricting plate and moves along a guide groove formed at an inner side of the housing, and that causes the restricting plate to bend towards the opposite side from the insertion direction of the pipe.

In the pipe connector of Additional Note 3, if the restricting member is pressed towards the inner side from the outer side in the radial direction of the pipe against the housing, the guide projection which protrude from side portion of the restricting plate move along guide groves formed on the inner side of the housing, so that the restricting plate bends towards the opposite side from the insertion direction of the pipe. Here, in the above-described pipe connector, the restricting plate can be made to bend towards the opposite from the insertion direction of the pipe by means of a simple structure that uses guide groove and guide projection.

(Additional Note 4)

The pipe connector according to Additional Note 3, in which an annular portion, that is capable of abutting against the at least one O-ring around the insertion hole, is formed in the restricting plate, and the annular portion is inserted into the insertion hole in a state in which the restricting member has been attached to the housing completely.

In the pipe connector of Additional Note 4, in a state in which the restricting member has been completely attached to the housing, because the annular portion is inserted into the insertion hole in the housing, compared with a structure, for example, in which the annular portion is not inserted into the insertion hole, an improvement in the filling rate of the at least one O-ring in relation to the space provided for installing the at least one O-ring can be achieved. As a consequence, the quality of the seal provided by the at least one O-ring between the housing and the pipe is improved.

(Additional Note 5)

The pipe connector according to Additional Note 3 or Additional Note 4, in which a stopper portion is provided on a free end side of the restricting plate, and an engaging portion is provided on an inner side of the housing, the engaging portion being engaged with the stopper portion in a state in which the restricting member has been attached to the housing completely.

In the pipe connector of Additional Note 5, in a state in which the restricting member has been completely attached to the housing, because the stopper portion provided on the free end side of the restricting plate engage with the engaging portion of the housing, the bending of the restricting plate in the insertion direction of the pipe and towards the opposite side from this insertion direction is restricted. As a consequence, in the above-described pipe connector, for example, in a state in which the restricting member has been completely attached to the housing, compared with a structure in which the bending of the restricting plate in the insertion direction of the pipe and towards the opposite side from this insertion direction is not restricted, the quality of the seal provided by the at least one O-ring is kept stable.

The disclosures of Japanese Patent Application No. 2017-037535 filed Feb. 28, 2017 are incorporated into the present specification by reference in their entirety.

All references, patent applications and technical specifications cited in the present specification are incorporated by reference into the present specification to the same extent as if the individual references, patent applications and technical specifications were specifically and individually recited as being incorporated by reference.

The invention claimed is:

1. A pipe connector comprising:
   a housing in which an insertion hole is formed, a pipe having an annular spool being inserted into the insertion hole;
   at least one O-ring that is disposed inside the insertion hole, and that forms a seal between an inner circumferential surface of the insertion hole and an outer circumferential surface of the pipe;
   a restricting member that is attached to the housing from an outer side in a radial direction of the pipe; and
   a restricting portion that is provided at the restricting member,
   wherein the restricting portion bends towards an opposite side from an insertion direction of the pipe when the restricting member is pressed from the outer side in the radial direction of the pipe towards an inner side in the radial direction of the pipe, and elastically returns so as to abut against and thereby restrict movement of the at least one O-ring towards the opposite side from the insertion direction of the pipe when the restricting member has been completely attached to the housing.

2. The pipe connector according to claim 1, wherein the restricting member additionally has a holding portion that engages with the spool of the pipe so as to restrict movement towards the opposite side from the insertion direction of the pipe.

3. The pipe connector according claim 2, wherein the restricting portion is provided with: a restricting plate that is supported in a cantilever fashion and in which is formed a through hole through which the pipe is inserted; and a guide projection that protrudes from a side portion of the restricting plate and moves along a guide groove formed at an inner side of the housing, and that causes the restricting plate to bend towards the opposite side from the insertion direction of the pipe.

4. The pipe connector according to claim 3, wherein:
   an annular portion, that is capable of abutting against the at least one O-ring around the insertion hole, is formed in the restricting plate, and
   the annular portion is inserted into the insertion hole in a state in which the restricting member has been completely attached to the housing.

5. The pipe connector according to claim 4, wherein:
   a stopper portion is provided on a free end side of the restricting plate, and
   an engaging portion is provided on an inner side of the housing, the engaging portion being engaged with the stopper portion in a state in which the restricting member has been completely attached to the housing.

6. The pipe connector according to claim 3, wherein:
a stopper portion is provided on a free end side of the restricting plate, and
an engaging portion is provided on an inner side of the housing, the engaging portion being engaged with the stopper portion in a state in which the restricting member has been completely attached to the housing.

7. The pipe connector according claim 1, wherein the restricting portion is provided with: a restricting plate that is supported in a cantilever fashion and in which is formed a through hole through which the pipe is inserted; and a guide projection that protrudes from a side portion of the restricting plate and moves along a guide groove formed at an inner side of the housing, and that causes the restricting plate to bend towards the opposite side from the insertion direction of the pipe.

8. The pipe connector according to claim 7, wherein:
an annular portion, that is capable of abutting against the at least one O-ring around the insertion hole, is formed in the restricting plate, and
the annular portion is inserted into the insertion hole in a state in which the restricting member has been completely attached to the housing.

9. The pipe connector according to claim 8, wherein:
a stopper portion is provided on a free end side of the restricting plate, and
an engaging portion is provided on an inner side of the housing, the engaging portion being engaged with the stopper portion in a state in which the restricting member has been completely attached to the housing.

10. The pipe connector according to claim 7, wherein:
a stopper portion is provided on a free end side of the restricting plate, and
an engaging portion is provided on an inner side of the housing, the engaging portion being engaged with the stopper portion in a state in which the restricting member has been completely attached to the housing.

11. A pipe connector comprising:
a housing in which an insertion hole is formed, a pipe having an annular spool being inserted into the insertion hole;
at least one O-ring that is disposed inside the insertion hole, and that forms a seal between an inner circumferential surface of the insertion hole and an outer circumferential surface of the pipe;
a restricting member that is attached to the housing from an outer side in a radial direction of the pipe; and
a restricting portion that is provided at the restricting member,
wherein the restricting portion bends towards an opposite side from an insertion direction of the pipe when the restricting member is pressed from the outer side in the radial direction of the pipe towards an inner side in the radial direction of the pipe, and elastically returns so as to restrict movement of the at least one O-ring towards the opposite side from the insertion direction of the pipe when the restricting member has been completely attached to the housing, and
wherein the restricting portion is provided with: a restricting plate that is supported in a cantilever fashion and in which is formed a through hole through which the pipe is inserted, and a guide projection that protrudes from a side portion of the restricting plate and moves along a guide groove formed at an inner side of the housing, and that causes the restricting plate to bend towards the opposite side from the insertion direction of the pipe.

12. The pipe connector according to claim 11, wherein:
an annular portion, that is capable of abutting against the at least one O-ring around the insertion hole, is formed in the restricting plate, and
the annular portion is inserted into the insertion hole in a state in which the restricting member has been completely attached to the housing.

13. The pipe connector according to claim 12, wherein:
a stopper portion is provided on a free end side of the restricting plate, and
an engaging portion is provided on an inner side of the housing, the engaging portion being engaged with the stopper portion in a state in which the restricting member has been completely attached to the housing.

14. The pipe connector according to claim 11, wherein:
a stopper portion is provided on a free end side of the restricting plate, and
an engaging portion is provided on an inner side of the housing, the engaging portion being engaged with the stopper portion in a state in which the restricting member has been completely attached to the housing.

15. A pipe connector comprising:
a housing in which an insertion hole is formed, a pipe having an annular spool being inserted into the insertion hole;
at least one O-ring that is disposed inside the insertion hole, and that forms a seal between an inner circumferential surface of the insertion hole and an outer circumferential surface of the pipe;
a restricting member that is attached to the housing from an outer side in a radial direction of the pipe; and
a restricting portion that is provided at the restricting member,
wherein the restricting portion bends towards an opposite side from an insertion direction of the pipe when the restricting member is pressed from the outer side in the radial direction of the pipe towards an inner side in the radial direction of the pipe, and elastically returns so as to restrict movement of the at least one O-ring towards the opposite side from the insertion direction of the pipe when the restricting member has been completely attached to the housing,
wherein the restricting member additionally has a holding portion that engages with the spool of the pipe so as to restrict movement towards the opposite side from the insertion direction of the pipe, and,
wherein the restricting portion is provided with: a restricting plate that is supported in a cantilever fashion and in which is formed a through hole through which the pipe is inserted, and a guide projection that protrudes from a side portion of the restricting plate and moves along a guide groove formed at an inner side of the housing, and that causes the restricting plate to bend towards the opposite side from the insertion direction of the pipe.

16. The pipe connector according to claim 15, wherein:
an annular portion, that is capable of abutting against the at least one O-ring around the insertion hole, is formed in the restricting plate, and
the annular portion is inserted into the insertion hole in a state in which the restricting member has been completely attached to the housing.

17. The pipe connector according to claim 16, wherein:
a stopper portion is provided on a free end side of the restricting plate, and
an engaging portion is provided on an inner side of the housing, the engaging portion being engaged with the stopper portion in a state in which the restricting member has been completely attached to the housing.

18. The pipe connector according to claim 15, wherein:
a stopper portion is provided on a free end side of the restricting plate, and
an engaging portion is provided on an inner side of the housing, the engaging portion being engaged with the stopper portion in a state in which the restricting member has been completely attached to the housing.

\* \* \* \* \*